Feb. 1, 1966     S. W. ENGLUND ETAL     3,232,700
RECOVERY OF CHEMICALS FROM SMELTS OF SPENT SODA-BASE LIQUORS
Filed Sept. 1, 1961
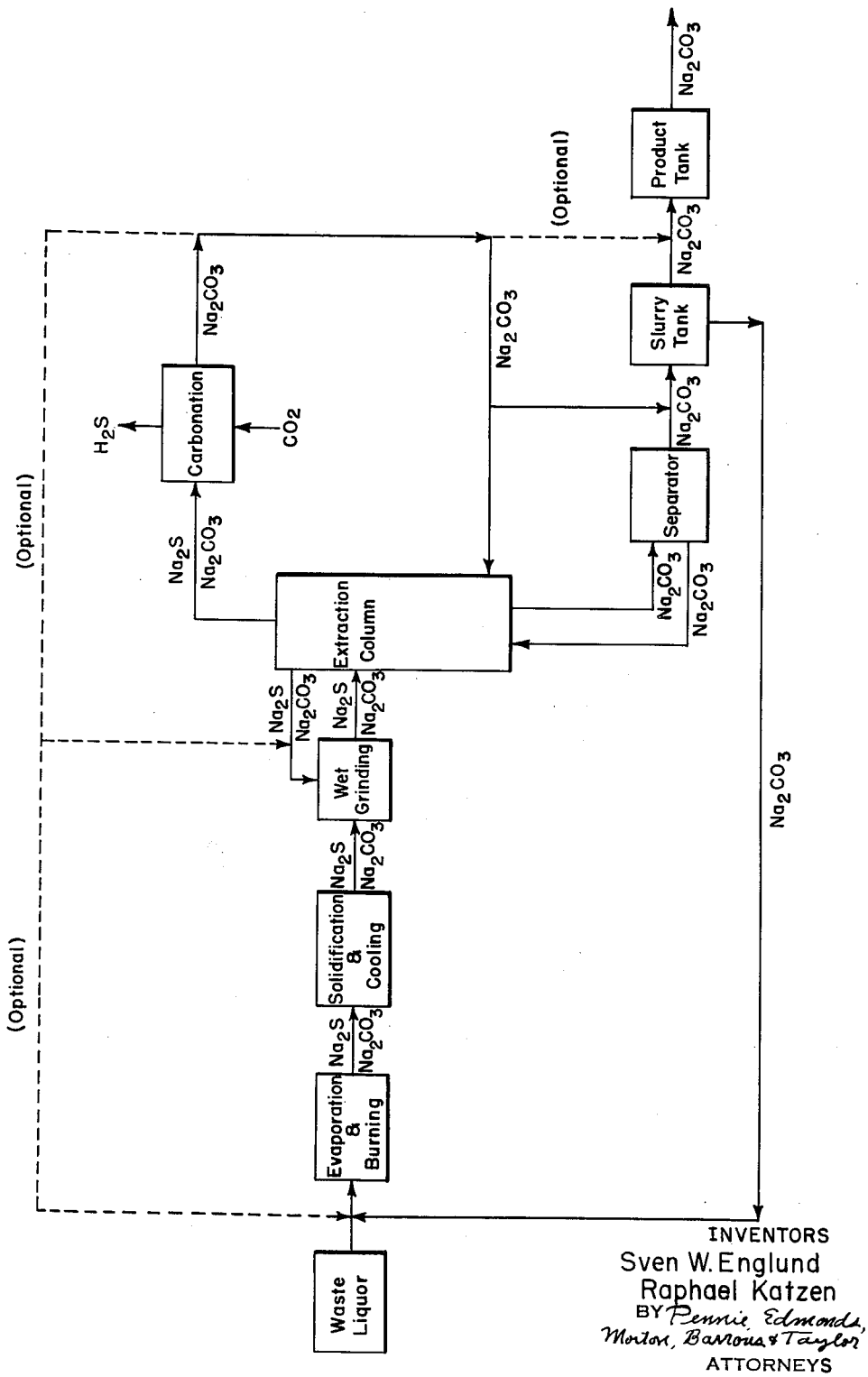
INVENTORS
Sven W. Englund
Raphael Katzen
BY Pennie, Edmonds,
Morton, Barrows & Taylor
ATTORNEYS

United States Patent Office 3,232,700
Patented Feb. 1, 1966

3,232,700
RECOVERY OF CHEMICALS FROM SMELTS OF SPENT SODA-BASE LIQUORS
Sven W. Englund, New Canaan, Conn., and Raphael Katzen, Cincinnati, Ohio, assignors to Rayonier Incorporated, Shelton, Wash., a corporation of Delaware
Filed Sept. 1, 1961, Ser. No. 135,618
2 Claims. (Cl. 23—48)

This invention relates to the recovery and utilization of chemicals in residual aqueous liquors from the digestion of wood pulp, and has for its object the provision of an improved process for this purpose. The invention is particularly concerned with the recovery of chemicals from the spent liquors of the acid-sulfite, neutral-sulfite and alkaline-sulfate wood pulp digestion operations (hereinafter referred to as spent soda-base liquor). It is common practice to evaporate and burn such liquors under reducing conditions to form solid smelts and to recover chemicals therefrom, and the invention provides improvements in the treatment of the smelts to recover and utilize chemicals contained in the smelt.

The solid smelt from spent soda-base pulping operations contains as its major components sodium carbonate, sodium sulfide and sodium sulfate and is discharged as a molten slag-like material from the furnace in which the organic material is burned off under reducing conditions. It has been the practice heretofore to run the molten smelt into a dissolving tank, usually at a temperature of from 1450° to 1600° F., to form an aqueous solution. This practice of dumping the hot smelt into water has resulted in serious explosions apparently due to the large chunks of smelt which sink into the water and to the chemical reactivity of portions of the smelt in water.

In accordance with this invention the molten smelt is poured onto a cooled metal surface such as a casting wheel to form relatively small particles of solid smelt which are passed into a wet grinder in which they are ground to a fine state of subdivision in a solution of sodium carbonate and sodium sulfide. The combination of cooling to a solid state followed by grinding in an aqueous solution of sodium carbonate and sodium sulfide, preferably a saturated or highly concentrated solution of sodium carbonate having little if any capacity to dissolve sodium carbonate results in a mixture or slurry that is very effectively treated in a succeeding stage of the process.

One of the important aspects of the process of the invention is the provision of a cyclic system for treating the ground slurry to form a solution high in sodium sulfide for carbonation to form hydrogen sulfide and sodium carbonate, and separate from the slurry the solids which are mainly sodium carbonate in a saturated solution of sodium carbonate. This slurry from the grinding operation is advantageously subjected to a countercurrent extraction with a solution high in sodium carbonate, preferably saturated, with minor amounts of other salts, to dissolve at least most of the sodium sulfide without dissolving any appreciable amount, if any, sodium carbonate. This results in a solution high in sodium sulfide containing sodium carbonate which can be effectively treated by carbonation, and a slurry of sodium carbonate crystals in a saturated solution of sodium carbonate which can be used to neutralize spent soda-base liquor or for other purposes.

The accompanying drawing is a flow sheet illustrating diagrammatically an arrangement of apparatus for carrying out a process of the invention. The units of equipment illustrated are connected by lines representing pipes through which solutions or slurries flow, by pumping when necessary in the directions shown by the arrows.

The spent soda-base liquors such as from the sodium-base acid sulfite process when evaporated and burned release appreciable amounts of volatile sulfur dioxide and a smelt of high sulfidity. The burning of the spent liquor under reducing conditions results in the formation of sodium sulfide and a mixed smelt of high melting point. It has been the practice heretofore to incorporate sodium carbonate, preferably in solid form, together with sodium carbonate solution, in the spent sulfite liquor prior to the burning to neutralize the liquor and minimize the loss of sulfur dioxide and the corrosive action of the chemicals on the equipment, and to flux and thereby lower the melting point of the resulting smelt. This aspect of the complete process is described more fully in Patents 2,824,071 and 2,841,561.

A typical smelt resulting from the acid sulfite digestion of wood and neutralized by the incorporation therein of sodium carbonate should advantageously contain about 35% of sodium sulfide, 60% sodium carbonate with the balance largely sodium sulfate. The advantages of such a composition will be apparent when it is recognized that the melting point would be about 1455° F. which compares very favorably with the melting point of sodium carbonate at 1566° F. and the melting point of sodium sulfide at 2156° F.

In carrying out a preferred process of the invention the molten smelt is poured onto a flat rotating wheel which has internal cooling means to solidify the smelt in a thin sheet. Usually at least 270° of the wheel surface can be used to provide a large heat transfer surface. The thickness of the sheet can be varied as desired by controlling the speed of the wheel. The cool solid smelt is scraped from the wheel and is charged into a wet grinder. Thus, by eliminating the heat of fusion and much of the sensible heat in reducing the temperature to less than 500° F. it is possible to introduce the solid smelt into a limited and controlled quantity of water or aqueous solution without causing an explosion.

The solid sheets of smelt are charged into the wet grinder and are ground in a solution of sodium sulfide and sodium carbonate, preferably a concentrated solution of sodium carbonate cyclically returned from the operation. We have discovered that the subsequent leaching of the ground material can be most efficiently carried out when the material has been reduced to a particular particle size. The following table shows the effect of particle size on leaching time in minutes in a saturated sodium carbonate solution at 194° F.

| Mesh Size | Leaching Time in Minutes | | | |
|---|---|---|---|---|
| | 10 | 15 | 20 | 30 |
| 10-20% Na₂S remaining with solid | 9.5 | 7.5 | 5.5 | 2.7 |
| 20-30% Na₂S remaining with solid | 3.3 | 2.1 | 1.2 | .0 |
| 35-50% Na₂S remaining with solid | 1.5 | 0.8 | 0.4 | .0 |

The wet grinder eliminates the dust problems associated with dry grinding and such grinding is important in our process since sodium sulfide is a depilatory agent which can cause skin burns. Sufficient solution of sodium sulfide-sodium carbonate from the extraction stage is used not only to wet the smelt but also to serve as a carrier since it is easier to pump a slurry than it is to handle a solid from which it is desirable to exclude oxygen.

It is known that sodium sulfide depresses the solubility of sodium carbonate in a solution of the two. Advantage is taken of this phenomenon to separate the sodium sulfide in the smelt for further processing from a major portion of the sodium carbonate present in the smelt. In order to effectively remove practically all the sodium sulfide from the sodium carbonate of the solids the ground smelt slurry is treated in a countercurrent liquid-solid extraction system in which sodium carbonate solution is introduced at the end from which the carbonate crystals are removed and the solution flows countercurrent to the solids flow. This slurry is preferably passed into a vertical column in which the solids settle countercurrent to an upwardly moving sodium carbonate solution.

The sodium carbonate will dissolve and become increasingly more concentrated with sodium sulfide as it flows through the extractor. At the point of discharge from the extractor the solution will have reached an equilibrium ratio between sodium sulfide and sodium carbonate. The following equilibrium ratios are typical:

| $Na_2S$, g./l. | $Na_2CO_3$, g./l. |
|---|---|
| 300 | 20.5 |
| 250 | 42.7 |
| 240 | 53.0 |
| 180 | 100.0 |

In carrying out an operation of the invention, the ground smelt slurry is advantageously dropped from the wet grinder to a holding tank (not shown) from which it is pumped to the liquid-solid extraction column. The smelt particles fall through the column in contact with a solution of sodium carbonate rising countercurrent through the column. Sodium sulfide is leached out of the particles leaving a slurry of sodium sulfide free sodium carbonate particles in a solution of sodium carbonate at the base of the column. This sodium carbonate slurry is charged into a separator such as a continuous centrifuge in which the solids are separated from the sodium carbonate solution. This separated sodium carbonate solution is recycled to the base of the column.

The sodium sulfide-rich solution overflowing the top of the extraction tower is pumped to a carbonation stage of any suitable type to react carbon dioxide with the sodium sulfide and form hydrogen sulfide and sodium carbonate. Advantageous types of carbonation treatments are described in Patents 2,675,297 and 2,841,561.

In accordance with the carbonation process described more fully in the aforementioned patents a hot sodium sulfide-containing solution is subjected to carbonation and steam stripping. The solution is preferably treated in a countercurrent manner under pressure with a gas containing carbon dioxide. The objective in the flash stripping operation is to remove sulfur from the solution as volatile hydrogen sulfide and to recover as much as possible of the hydrogen sulfide in concentrated form. When the hot carbonated solution under pressure is released into a vacuum tower and contacted with steam the gas evolved is substantially hydrogen sulfide and water vapor. In the preferred method of operation the carbonation treatment is effected at a temperature of 50–150° C. with a carbon dioxide gas pressure of from 16–165 lbs. per square inch absolute, such that the mol ratio of carbon dioxide absorbed to total titratable alkali in the solution is in the range of 0.6 to 1.2. The hot carbonated solution while under pressure is directed into a vessel maintained under a vacuum preferably of from 5–29 inches of mercury where hydrogen sulfide and steam are flashed off releasing a substantial portion of the hydrogen sulfide. The water vapor can be removed by condensation and the hydrogen sulfide burned to form sulfur dioxide or otherwise used as desired. The carbonation and flash stripping of hydrogen sulfide may be carried out in multiple stages if desired.

The carbonation and flash stripping operations may be carried out in any type of equipment conventionally employed for gas absorption or stripping operations, for example in packed columns, plate columns, spray columns and continuous liquid phase columns. The carbon dioxide gas may be obtained from the best available source as dictated by the economics of the process, such as commercial carbon dioxide or flue gas or lime kiln gas.

In a process carried out in the arrangement of apparatus illustrated, a part of the sodium carbonate solution from the carbonation stage may be directed to the lower portion of the extraction column wherein it is used to dissolve sodium sulfide. Alternatively, a portion of the solution of sodium carbonate which is recovered from the carbonation treatment may be directed to the spent sulfite liquor prior to burning for neutralization and lowering the melting point of the smelt or it may be otherwise used as desired. In another alternative part of the process some of the solution of sodium carbonate from the carbonation stage is added to the wet grinder.

The solid material removed from the lower portion of the extraction column is a slurry of sodium carbonate crystals in mother liquor containing some solid sodium sulfate which is passed into the centrifuge separator. Some of the solution of sodium carbonate from the carbonation stage is used to sluice the sodium carbonate crystals from the centrifuge to a slurry tank. The concentrated solution from the centrifuge is returned into the lower part of the extraction column. From the slurry tank any desired portion of the concentrated solution of sodium carbonate and sodium carbonate crystals together with any other salt that may be present is returned to the spent sulfite liquor for neutralizing as previously described. If desired a portion of the slurry may be directed to a product tank for any desired use. Optionally some of the concentrated solution of sodium carbonate from the carbonation stage may be sent to the product tank. One practical use for the sodium carbonate crystals or solution is for making up cooking liquor for the pulping operation.

In a preferred method of operation part of the sodium carbonate solution from the final stripping of hydrogen sulfide in the carbonation stage is fed back to the base of the extraction tower. The flow of carbonate solution is ratioed to the weight of solid smelt fed to the wet grinder to maintain the desired concentration of sodium sulfide and sodium carbonate in saturated solution flowing from the top of the extraction tower to the carbonation stage.

We claim:
1. In an operation in which spent soda-base liquor from the digestion of wood is evaporated and burned under reducing conditions to form a smelt comprising sodium carbonate and sodium sulfide, the improvement which comprises cooling and solidfying the smelt in a thin sheet by pouring it onto a cooled metal surface, scraping the solidified smelt sheet from the surface, wetting the cooled smelt sheet with a solution containing sodium carbonate and sodium sulfide, grinding the wet smelt to a fine state of subdivision so that substantially all of the ground smelt will pass through a screen of 10 mesh per lineal inch, subjecting the ground smelt to a countercurrent extraction with a concentrated solution of sodium carbonate to dissolve the sodium sulfide, said smelt particles being in such a fine state that the extraction dissolves substantially all of the sodium sulfide without essentially dissolving the sodium carbonate, and removing from the extraction a slurry of sodium carbonate crystals in a concentrated solution of sodium carbonate and a solution of sodium sulfide and sodium carbonate.

2. In the process of claim 1 wetting the cooled smelt sheet with a solution of sodium carbonate and sodium sulfide from the counter-current extraction.

References Cited by the Examiner
UNITED STATES PATENTS

| | | | |
|---|---|---|---|
| 2,642,399 | 6/1953 | Aries et al. | 23—48 X |
| 2,792,350 | 5/1957 | Bradley et al. | 23—48 X |
| 2,824,071 | 2/1958 | Gray et al. | 23—48 X |
| 2,862,887 | 12/1958 | Boyer | 23—48 X |
| 3,011,878 | 12/1961 | Lackey et al. | 23—123 X |
| 3,071,450 | 1/1963 | Martin | 23—310 |
| 3,111,377 | 11/1963 | Mugg | 23—48 |

OTHER REFERENCES

Nugent et al.: "Novel Smelt Jetting Method and Smelt Component Separation at Nekoosa," Paper Trade Journal, volume 140, page 50, May–August 1956.

MAURICE A. BRINDISI, *Primary Examiner.*